Aug. 31, 1954     E. R. SEWELL     2,687,607

LAWN MOWER AND MULCHER

Filed June 7, 1951

INVENTOR
Edward R. Sewell

BY Mason, Fenwick & Lawrence
ATTORNEYS

Patented Aug. 31, 1954

2,687,607

UNITED STATES PATENT OFFICE 2,687,607

LAWN MOWER AND MULCHER

Edward R. Sewell, Jacksonville, Fla.

Application June 7, 1951, Serial No. 230,339

2 Claims. (Cl. 56—25.4)

This invention relates to lawn mowers, and more particularly to a power lawn mower and mulcher so constructed as to substantially pulverize the mown grass and redeposit same on the sod.

An object of the invention is to provide a combination mower and mulcher which will be safe with respect to foreign objects such as rocks, bones, etc. on the lawn.

An additional object of the invention is to provide an improved power lawn mower which will eliminate the necessity for raking after mowing, and which will improve the condition of the lawn by mulching the mown grass during the mowing operation.

Another specific object of the invention is to provide a rotary blade power lawn mower wherein the cutting blade is completely housed to minimize the dangerous throwing out of rocks, broken pieces of the blade or any foreign object from the mower.

Further objects will more particularly appear in the course of the following detailed description.

The invention consists in the novel construction, arrangement and combinations of parts hereinafter more particularly described and claimed.

One sheet of drawing accompanies this specification as part thereof in which like reference characters indicate like parts throughout.

Figure 1:
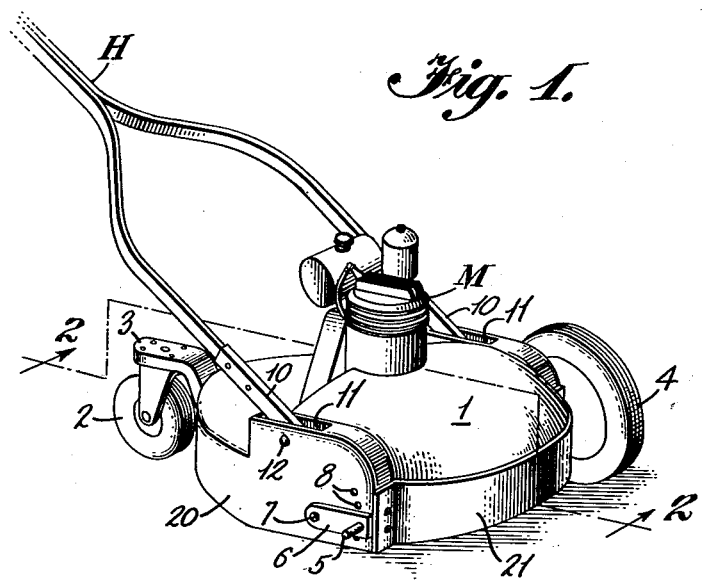
Figure 1 is a perspective view of the improved lawn mower with one ground contacting wheel and a portion of the handle broken away.
Figure 2:
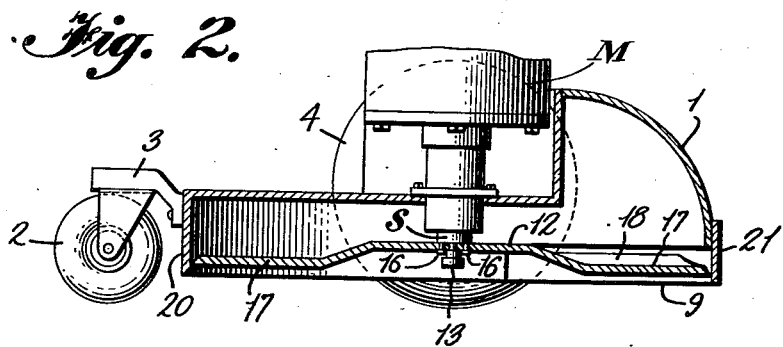
Figure 2 is an enlarged longitudinal cross sectional view taken on line 2—2 of Figure 1.
Figure 3:
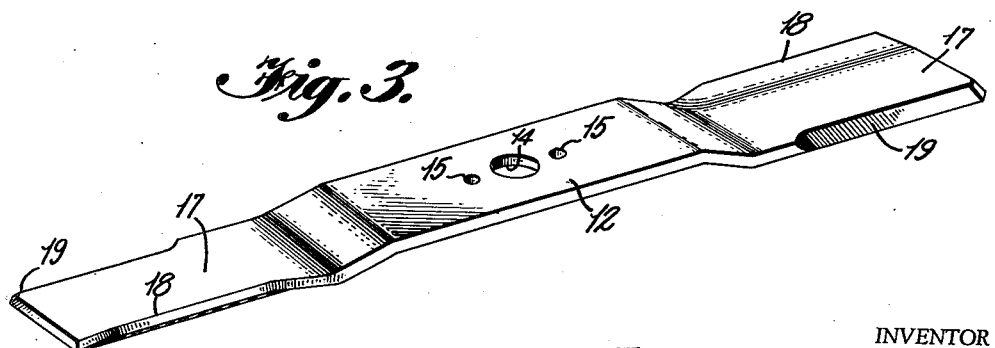
Figure 3 is a perspective view of the improved cutter blades shown on a larger scale.

Referring to the drawing which illustrates one practical embodiment of the present invention, the mower comprises a dome-like housing 1 herein illustrated as having a continuous skirt completely surrounding and encompassing the cutter blade as later described. A semicircular side wall portion 20 is formed integral with the roof portion and an auxiliary apron portion 21 associates the forward ends of the arcuate side wall portion 20, the side wall portion 20 and apron portion 21 completing the continuous skirt. The bottom edges of the side wall 20 and apron 21 lie in a common plane which is adapted to be maintained substantially parallel to the surface of the lawn by means of ground contacting wheels 4, one on either side, which wheels 4 are preferably mounted upon shafts 5 which extend through brackets 6, the brackets 6 being pivoted to the side wall 20 as by screws 7. The shaft 5 passes selectively through one or another of the arcuately spaced holes 8 by means of which the height of the housing above the ground can be adjusted as desired.

A rear caster wheel 2 is mounted upon a rearwardly extending bracket 3 also secured to the side wall 20.

Upon the roof of the housing 1 is mounted a suitable motor M arranged to drive a shaft S which extends to the interior of the housing approximately centrally thereof, the lower end of the drive shaft S being provided with spaced shear lugs 16 and a centrally secured bolt 13 for the cutter element.

The handle H by means of which the mower is advanced and guided has a forked lower end, the forked ends 10—10 being pivotally secured as by screws 12 in slots 11 formed in the housing, such as in the upper portion of the side wall portion 20.

The improved cutter blade 12 is formed with a centrally positioned hole 14 adapted to receive the securing screw 13 and with spaced holes 15 to accommodate the shear lugs 16 on the lower face of the drive shaft S.

As herein illustrated, the ends of the cutter blade 12 are slightly deflected to lie in a plane parallel with but slightly lower than the medial portion 12, and these end portions are provided with a beveled cutting edge 19 on their forward edges and the rearwardly positioned edges are upturned as at 18 to form fins or propeller elements so that as the cutter blade 12 is rotated, grass cut by the cutting edge 19 will be forced upwardly into the housing and will be rotated at a rapid speed and repeatedly brought into contact with the cutting edges 9 and the fins to effectively pulverize the same.

The cutter blade 12 is arranged so that its cutter elements 17 are positioned in a plane parallel with but spaced above the bottom peripheral edge 9 of the continuous skirt portion of the housing, which positioning of the cutter blade in conjunction with the enclosed dome-like housing above it, creates a high pressure zone within the housing, retaining the severed portions of the grass until they are thoroughly pulverized.

By thus positioning the cutter blade entirely within the housing, it will also be impossible for it to engage and throw by centrifugal force any bones, stones, etc. which may be encountered on the lawn. If such objects are small enough to pass under the housing they will be out of range of the cutter blade, thus greatly increasing the safety of operation.

Various modifications in the precise form of the housing and blade will suggest themselves to those skilled in the art but within the scope of the present invention as claimed.

Having thus described my invention, I claim:

1. In a combination mower and mulcher, a downwardly opening housing having a roof portion and a continuous circular imperforate peripheral skirt portion bounding said roof, ground contacting wheels journaled on said housing for supporting the housing with the bottom edge of the peripheral skirt portion in a plane parallel with and spaced above the ground, a motor mounted on the housing having a vertical drive shaft extending into the housing along the medial axis of said peripheral skirt portion, and a cutter blade mounted on the drive shaft and disposed within the housing, said blade having cutting portions each comprising a beveled leading edge forming a cutting edge and an upwardly inclined deflector along the trailing edge thereof, said cutting portions being located in a plane spaced above and parallel to the plane defined by the bottom peripheral edge of the housing skirt portion and within the housing, said bottom edge being continuous and forming with said skirt portion a continuous guard for the ends of said cutter blade, and said roof having an upwardly and inwardly curved wall portion terminating adjacent said medial axis in an upright wall portion defining a pressure chamber overlying said cutting portions of the cutter blade along substantially the forward half of the circular path thereof to receive grass which is cut and thrown upwardly by said cutter blade and re-direct the same downwardly into the path of said cutting portions to effect re-cutting of the grass into smaller pieces.

2. In a combination mower and mulcher, a downwardly opening housing having a roof portion and a continuous circular imperforate peripheral skirt portion bounding said roof, ground contacting wheels journaled on said housing for supporting the housing with the bottom edge of the peripheral skirt portion in a plane parallel with and spaced above the ground, a motor mounted on the housing having a vertical drive shaft extending into the housing along the medial axis of said peripheral skirt portion, and a cutter blade mounted on the drive shaft and disposed within the housing, said blade having cutting portions each comprising a beveled leading edge forming a cutting edge and an upwardly inclined deflector along the trailing edge thereof, said cutting portions being located in a plane spaced above and parallel to the plane defined by the bottom peripheral edge of the housing skirt portion and within the housing, said bottom edge being continuous and forming with said skirt portion a continuous guard for the ends of said cutter blade, and said roof having an upwardly and inwardly curved wall portion terminating in a downwardly extending wall portion disposed laterally of said housing adjacent said medial axis defining a pressure chamber overlying said cutting portions of the cutter blade along substantially the forward half of the circular path thereof to receive grass which is cut and thrown upwardly by said cutter blade and re-direct the same downwardly into the path of said cutting portions to effect re-cutting of the grass into smaller pieces.

References Cited in the file of this patent

UNITED STATES PATENTS

| Number | Name | Date |
|---|---|---|
| 2,471,367 | Cavaness | May 24, 1949 |
| 2,491,544 | Arkenberg | Dec. 20, 1949 |
| 2,502,696 | Barnes | Apr. 4, 1950 |
| 2,521,972 | Haglund et al. | Sept. 12, 1950 |
| 2,539,779 | Grosso | Jan. 30, 1951 |
| 2,578,880 | Doyle | Dec. 18, 1951 |